United States Patent

[11] 3,625,161

[72] Inventor Bette J. Rosner
 6777 E. Pleasant Run Parkway, South Drive, Indianapolis, Ind. 46219
[21] Appl. No. 882,963
[22] Filed Dec. 8, 1969
[45] Patented Dec. 7, 1971

[54] FOLDING TRAY
 1 Claim, 3 Drawing Figs.

[52] U.S. Cl. ....................................................... 108/44
[51] Int. Cl. ....................................................... A47b 23/00
[50] Field of Search ........................................... 108/42–49

[56] References Cited
UNITED STATES PATENTS

| | | | |
|---|---|---|---|
| 1,299,827 | 4/1919 | Edwards | 108/44 UX |
| 2,289,945 | 7/1942 | Wadsack | 108/43 X |
| 2,687,336 | 8/1954 | Smith et al. | 108/44 UX |
| 2,741,521 | 4/1956 | Bell et al. | 108/44 UX |
| 2,856,251 | 10/1958 | Garrison | 108/44 |
| 2,921,824 | 1/1960 | Richter | 108/44 X |
| 2,932,544 | 4/1960 | Lambert | 108/44 UX |
| 3,037,639 | 6/1962 | Kost | 108/44 UX |
| 3,386,392 | 6/1968 | Gramm | 108/44 |

*Primary Examiner*—Francis K. Zugel
*Assistant Examiner*—Glenn O. Finch
*Attorney*—Woodard, Weikart, Emhardt & Naughton ABSTRACT: Folding tray for use in conjunction with the seat of an automobile. The tray is supported by a pair of leg portions that terminate in hooks which engage the back of an automobile seat. The hooks swivel between extended, use position and retracted, storing position. They are also movable laterally to span the space between two bucket-type seats. The tray is supported by a single brace and is readily adjustable to varying heights.

PATENTED DEC 7 1971

3,625,161

INVENTOR
BETTE J. ROSNER
BY
Woodard Weikart Emhardt & Naughton
ATTORNEYS

FOLDING TRAY

BACKGROUND OF THE INVENTION

In the modern world of the quick-serve restaurant it is very desirable for the customer to have a tray for the support of food and beverage in his automobile to facilitate his consumption of it while in transit. By the same token, in connection with the operation of drive-in restaurants it is necessary that there be trays for the food and beverages served to and eaten by the patron while parked in his automobile.

With the advent of modern turnpikes, extended automobile trips have become quite common. During these extended automobile trips, for both convenience and economic reasons, it is often desirable to eat and drink boxed lunches while the car is in motion or while stopped briefly at a rest center. This invention is concerned with a tray which is adapted to serve these ends. It is to be hooked over the back section of an automobile seat in such a fashion that a convenient eating surface is formed adjacent to the passengers. It may also be used to span the distance separating two bucket-type seats. In this use, one of the hooks will engage the back section of one of the seats while the other will engage that section of the other bucket seat.

The tray of this invention is particularly advantageous in that the relative height of the eating surface can be readily adjusted. Likewise, it is particularly advantageous in that all the components of the tray assembly fold in such a fashion that minimal storage and shipping space is occupied by the tray assembly.

As is mentioned above, trays for use in conjunction with automotive components are generally known in the prior art. However, the vast majority of them are disadvantageous in that either the structural components thereof do not fold upon themselves in such a fashion as to allow the tray to occupy minimal storage space, or the eating surface itself is not adjustable for height. The tray of this invention overcomes these difficulties of the prior art.

SUMMARY OF THE INVENTION

This invention is concerned with a tray which is useful in conjunction with an automobile seat. The relative height of the tray is readily adjustable. Likewise, all components of the tray are adapted to be folded back on each other in such a fashion that the tray occupies minimal storage space. The relative height of the tray is controlled by a single brace. The hook sections used in mounting the tray may be adjusted laterally to widen their potential support area.

DESCRIPTION OF THE PREFERRED EMBODIMENT

Figure 1:
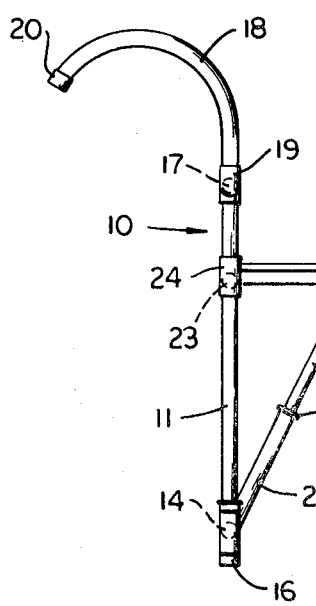
FIG. 1 is a side view of the tray in its extended, use position.

Referring to the Figures, the tray is shown generally at 10. It includes the vertically disposed, tubular legs 11 and 12. Connecting the legs as braces or crossbars are tubular sections 13 and 14. Together, the legs and the crossbars form a rectangle. The section 14 carries a ferrule 15 at each end to receive the lower extremity of each leg in friction fit relationship. A rubberized cap or tip 16 may be mounted on each ferrule to cushion it in the event it touches any surface that may scratch.

Figure 2:
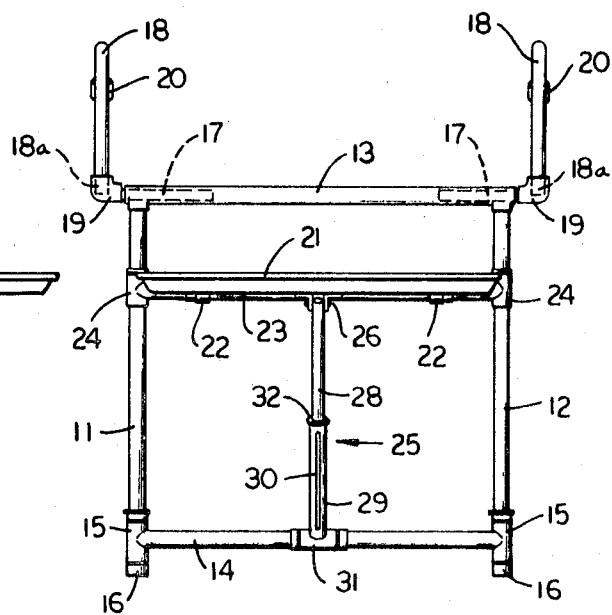
FIG. 2 is a front elevation view thereof.

The tubular section 13 is open ended to enable it to receive in sliding fit relationship the stub ends 17. The stub ends are press fitted or otherwise suitably mounted in elbows 19. The lower extremity 18a of each hook 18 is received in a loose fit or swivable relationship within the same elbows. As a result of this arrangement the hook members may be moved laterally to enable them to be mounted on rather widely spaced seat-back portions of an automobile, such for example as the bucket seat back portions of a sports car. Still further, the hook members may be swiveled or partially rotated within the elbows to move them to and from the extended use position as shown in FIGS. 1 and 2 and the collapsed or folded position shown in FIG. 3.

The tip ends of the hook members may also be capped with a rubber cap 20 to cushion any impact with a surface that shows scratches.

The tray 21 is connected by hinges 22 to a third crossbar 23 that carries at each end the ferrules 24. These ferrules are sized to receive the legs 11 and 12 in sliding fit relationship so that the tray may be moved upwardly or downwardly as desired.

A single tray brace shown generally at 25 is pivotally connected to the bottom of the tray through the medium of the pivot pin 26 that is journaled in the bracket 27. The brace consists of two telescoping members 28 and 29. A spring 30 is housed in member 29 and normally biases the tray upwardly into horizontal, use position.

Member 29 terminates at its lower end in a ferrule 31 that receives tubular crossbar 14 in sliding fit relationship.

Figure 3:
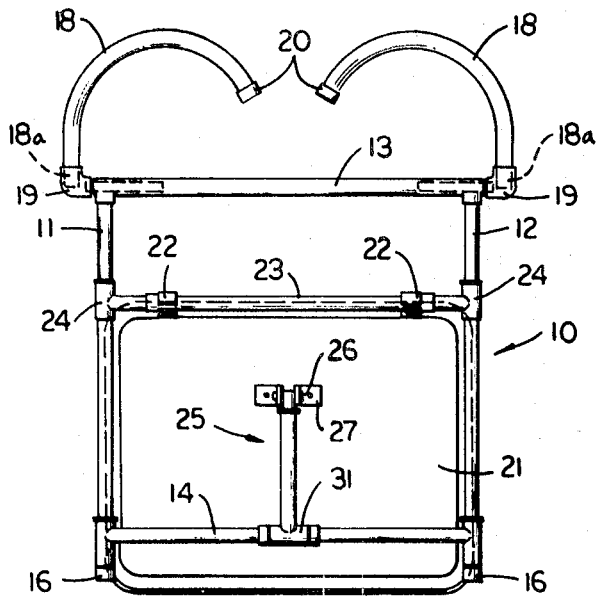
FIG. 3 is a view of the tray in its collapsed, folded position.

From the foregoing description it can be seen that the hooks may be moved from their inwardly directed, storage position of FIG. 3 to their extended, use position of FIGS. 1 and 2. By the same token, the tray may be swung upwardly from its collapsed position shown in FIG. 3 to its use position shown in the other two Figures. That position is maintained by the action of the spring which will be of such compression that it will prevent the tray from departing from the horizontal as long as only normal "loads" are placed upon the tray in the form of food and beverage. Of course, when the tray is to be collapsed, that can readily be accomplished by manually forcing it downwardly to its overcenter collapsed position of FIG. 3.

It will also be noted from the foregoing description that the height of the tray can readily be adjusted. If it is desired to lower that height, the telescoping members 28 and 29 can be relatively moved or adjusted whereupon the stop element or ring 32 of conventional type may be moved to the desired stop position for retaining the two telescoping members in that position. The action of the stop element is the same as that on a swinging screen door assembly.

What is claimed is:

1. A tray assembly comprising a frame, a tray and mounting elements for use in supporting the tray from the back of an automobile seat, said frame including a pair of spaced legs and a pair of spaced crossbars connecting said legs, said tray having means slidable upon said legs for varying the height of said tray, support means connecting said tray and one of said crossbars for supporting said tray in any adjusted position, and said mounting elements include hooks swivably connected to the other of said crossbars, and wherein, said other crossbar is hollow at its ends and said mounting elements have members slidable between different positions within said hollow ends for varying the lateral reach of said hooks, the swivel connection between the hooks and the other of said crossbars comprises an elbow in which said hooks are mounted to swivel between use and collapsed positions and a stub shaft connected to said elbow and slidable between different positions within said hollow ends for varying the lateral reach of said hooks.

* * * * *